United States Patent [19]
Kirby

[11] Patent Number: 5,258,425
[45] Date of Patent: Nov. 2, 1993

[54] SOLVENT-FREE FLOORCOVERING ADHESIVE AND METHOD OF PRODUCING SAME

[75] Inventor: Lisa M. Kirby, Dalton, Ga.
[73] Assignee: Capitol Adhesives, Inc., Dalton, Ga.
[21] Appl. No.: 704,410
[22] Filed: May 23, 1991
[51] Int. Cl.$^5$ .............................. C08J 3/00
[52] U.S. Cl. .................................. 523/337; 524/501
[58] Field of Search ............... 524/501, 490; 523/337

[56] References Cited
U.S. PATENT DOCUMENTS
4,486,563  12/1984  Jagisch et al. ................ 524/158

*Primary Examiner*—John C. Bleutge
*Assistant Examiner*—Mark Sweet
*Attorney, Agent, or Firm*—Hopkins & Thomas

[57] ABSTRACT

A solvent-free adhesive formulation and a method for producing the adhesive is disclosed, the method involving dissolving resin in a heated oil and adding a surfactant thereto for dispersion purposes. Water is added to the resultant mixture to form an emulsion. A caustic agent is added to stabilize the emulsion and latex and thickener are added to the emulsion at ambient temperature. A stable, solvent-free adhesive is produced having superior bond strength and aging characteristics.

9 Claims, No Drawings

SOLVENT-FREE FLOORCOVERING ADHESIVE AND METHOD OF PRODUCING SAME

BACKGROUND OF THE INVENTION

Common floorcovering adhesives intended for use with carpet or vinyl floor coverings are water-based emulsions based upon either acrylic or Styrene Butadiene (SBR) latex. Acrylic-based formulas, because of expense and low bond strength, are generally used only when necessary for a pressure-sensitive application or for resistance to plasticizers in pure vinyl backings. SBR-based floorcovering adhesives are by far the predominant type and require the addition of a tackifier for development of bond strength and proper modulus. The traditional means of tackifying an adhesive of this type is the addition of a hydrocarbon resin. Since these resins are solid at room temperature, they must be liquefied in order to be incorporated into an emulsion (consisting of petroleum process oil, resin, surfactant, and water). This is usually done by dissolving the resin in an organic solvent carrier. Organic solvents are heavily scrutinized by government agencies for their contribution to air pollution, their flammability (in some cases), and they also degrade adhesive properties by slowing down curing time, swelling and weakening the rubber component, shortening the life of the applied product, and raising the level of surfactant required for emulsion stability (which in turn degrades the adhesive further).

It is possible to melt resin to liquefy it, but keeping it liquid throughout completion of the adhesive batch poses problems. Typical resins which are compatible with SBR-based floorcovering adhesives have softening points above 212 degrees F. Resins with lower softening points are too soft at room temperature to develop the final bond strengths required. Solvent-free resin emulsions are available from suppliers to the floorcovering adhesive industry. These emulsions begin by melting the resin (done at a temperature well above the boiling point of most liquids) and slowly adding a heat-stable surfactant and then water. Because of the temperature required, this emulsification must take place at elevated pressure to avoid boiling off the water. Upon cooling, the emulsion will remain liquid and stable. The disadvantages of this process are the expense and hazards associated with high pressure equipment, high surfactant levels (slows drying time and weakens bond strength), brittle aging characteristics, and limitation of solids content in the final product (resin emulsions are limited to about 60% solids).

It is possible to dissolve resin in a solvent carrier, form an emulsion with surfactant and water, and then fractionally evaporate the solvent. This process has all of the disadvantages of the above process, with the added cost of solvent recovery equipment. This process also does not eliminate the exposure of employees to organic solvents.

SUMMARY OF THE INVENTION

It is, therefore, one of the principal objects of the present invention to provide an adhesive with high bond strength and stability, which is produced in a solvent-free process.

Another object of the present invention is to provide a method for producing an adhesive which can be produced at atmospheric pressure without the use of solvents, obviating the need for high pressure equipment and solvent-recovery means.

A further object of the present invention is to provide solvent-free adhesives in various formulations that can be customized for specific installations depending on the product being installed.

A still further object of the present invention is to provide an adhesive composition that costs less to produce than comparable solvent-containing adhesives and which is easily applied.

These and additional objects are attained by the present invention which relates to a method for producing an adhesive that is primarily designed for floor coverings but may be equally useful in other fields. The adhesive is produced in a solvent-free process and attains superior bond strength and stability. The process involves the steps of adding resins and other components to heated petroleum process oil. This avoids the use of potentially dangerous solvents to dissolve the resin. While solvent-free adhesive formulations are known, they have not been able to achieve the high bond strength achieved by the present invention. Once the resin has dissolved in the heated oil, a surfactant or other suitable dispersing means is added to the mixture. The resulting composition may be supplemented with thickening agents, fillers, etc., which supplements can be added at ambient or room temperature.

Various additional objects and advantages of the present invention will become apparent from the following detailed description.

DETAILED DESCRIPTION OF THE PREFERRED EMBODIMENT

Solvent-free floorcovering adhesives can be produced at atmospheric pressure and the resulting product will have properties exceeding that of any adhesive produced by solvent-recovery, resin emulsion, or traditional methods. The process begins by heating petroleum process oil (common to all SBR latex flooring adhesives), such as a napthenic oil, to a temperature at least as high as the softening point of the resin means, which is normally hydrocarbon resin. The resin is added under agitation and dissolves into the oil. A suitable surfactant means is added to the oil-resin mixture, which has been cooled to just below boiling, the surfactant serving as a dispersing agent and as a precursor to emulsion formation. The surfactant may be, for example, potassium soap of disproportionated tall oil rosin, 80% solution in water; sodium lauryl sulfate, or a similar means. When the surfactant is completely dispersed, the resulting mixture is stable and can be stored at room temperature if desired. In a continuous process, the mixture is further allowed to cool but the temperature of the mixture is normally maintained above 100 degrees F when water is added for ease of mixing. Remaining ingredients (primarily mineral filler, SBR latex, and thickener) can be added at room temperature.

Although most floorcovering adhesive manufacturers have solvent-free products available, all known prior art adhesives of this type use commercially available resin emulsions and therefore have achieved low adhesion values and poor aging properties compared to adhesives produced by the instant method. Because of the negative effects of solvent and high surfactant levels, the present solvent-free adhesive has better bond strengths, aging characteristics, and stability than any commercially available adhesive. This process enables the production of an adhesive with minimal odor and no chemicals listed as hazardous by OSHA, SARA, EPA, or any other environmental agency. For comparison purposes, listed below is a prior art adhesive formulation along with the formula for the present invention, with the relative percentages of the ingredients being similar to illustrate the differences between the two formulas.

Typical formula for traditional, solvent-containing floorcovering adhesive:

| INGREDIENT | PARTS/100 |
| --- | --- |
| Severely hydrotreated petroleum hydrocarbon oil, consisting predominantly of hydrocarbons having carbon numbers in the range of C20–C50, having few enough aromatics and paraffinics to be classified as a naphthenic oil | 13.7 |
| Naphtha or other aliphatic solvent, consisting mainly of hydrocarbons in the range of C5–C8 | 1.5 |
| Hydrocarbon resin, such as a C9 resin or a blend of C9 resin and wood rosin (must be dissolved in solvent in a separate process) | 1.3 |
| Surfactant, such as potassium soap of disproportionated tall oil rosin | 4.5 |
| Caustic, such as a 45% solution of potassium hydroxide in water. | 0.8 |
| MAKE SURE INGREDIENTS ARE EVENLY MIXED BEFORE CONTINUING | |
| Water | 39.4 |
| Antifreeze, such as methanol | 0.6 |
| Mineral filler, such as a medium grind kaolin clay | 26.1 |
| Styrene Butadiene Latex, cold polymerized and 70% solids | 6.4 |
| Polyacrylate acidic thickener at 30–35% solids | 5.7 |
| | 100.0 |

The remaining ingredients are trace amounts of the following:
A hindered phenolic, solid antioxidant, which must be dissolved in solvent along with the resin.
A 30% solution of a silicone based defoamer
A 50% solution of a bactericide, such as 1,2-benzisothiazolin-3-one in water Typical formula for adhesive produced by solvent-free method:
(Surfactant levels were left the same for comparison purposes; actual surfactant levels required for stability are approximately 14% less of amount used here.)

| INGREDIENT | PARTS/100 |
| --- | --- |
| Petroleum process oil, such as hydrotreated petroleum hydrocarbon oil, consisting predominantly of hydrocarbons having carbon numbers in the range of C20–C50, having few enough aromatics and paraffinics to be classified as a naphthenic oil | 13.7 |
| Hydrocarbon resin, such as a C9 resin or a blend of C9 resin and wood rosin | 1.3 |
| HEAT ABOVE INGREDIENTS TO A TEMPERATURE ABOVE THE MELTING POINT OF THE RESIN (APPROXIMATELY 240° F.) | |
| Surfactant, such as Potassium soap of disproportionated tall oil rosin | 4.5 |
| Caustic, such as a 45% solution of potassium hydroxide in water | 0.8 |
| MAKE SURE INGREDIENTS ARE WELL-MIXED AND COOL TO BELOW 212° F. BEFORE CONTINUING | |
| Water | 40.0 |
| Antifreeze, a non-solvent type, such as a sorbitol solution made from hydrogenated corn syrup | 1.5 |
| Mineral filler, such as a medium grind kaolin clay | 26.1 |
| Styrene Butadiene latex, such as the cold polymerized type at 70% solids | 6.4 |
| Artificial thickener, such as the polyacrylate acidic type at 30–35% solids | 5.7 |
| | 100.0 |

The remaining ingredients are trace amounts of the following:
An antioxidant, such as a solid hindered phenolic type, which must be melted in the resin/oil mixture
A defoamer, such as silicone-based type at 30–35% solids
A bactericide, such as a 50% solution of 1,2-benzisothiazolin-3-one in water The second of the two formulas, when compared with the first in laboratory testing, yielded superior results. The solvent-free adhesive reached final bond strength sooner and bond strength was at least 25% greater than that of the traditionally prepared adhesive. Solvent-free products have been undergoing tests for several months and reports from actual floorcovering installations in field tests support the laboratory testing results.

Of the components in the preferred formula, certain alternate components may be used and the relative percentages of the components may vary. Thus, the specificity is meant to be taken as a showing of preferred examples and not a representation that components with similar properties are in any way excluded.

For example, petroleum process oil need not be napthenic. Aromatic oil obtained as the extract from a solvent extraction process and consisting predominantly of aromatic hydrocarbons having carbon numbers mainly in the range of C20 through C50 may also be used. However, aromatic oils which are not severely hydrotreated so as to become, in effect, a napthenic oil, are suspected carcinogens.

The resin/oil mixture should be at least 10% of the total formula weight. In general, the resin/oil mixture weight will not exceed 40% due to current cost considerations. With regard to relative percentages, at least a ratio of oil to resin is normally required for proper rigidity and emulsion stability. This ratio will vary depending on desired performance and the ultimate end use; however, the ratio will normally be less than 12:1. In addition, while specifying C9 resin, other resin types may be used as long as they are compatible with the selected latex.

The amount of surfactant varies directly with the amount and type of resin used. If a rosin is used, more surfactant will be required than if resin alone is used. Typically, most prior art formulations have used 100% resin and the present invention may be practiced as such. There is however, a wide range of blends which are also suitable for the practice of my invention. As noted hereinabove, high surfactant levels slow drying time and weaken bond strength, thus the resin/rosin component preferably has a higher resin component.

The amount of thickener used is a function of desired viscosity. For floorcovering adhesives, viscosities are normally in the range of from 30,000 to 150,000 centipoise. The caustic used (i.e. solution of KOH in water) is used to activate the acidic thickener and to enhance emulsion stability. With regard to fillers such as clay, mineral fibers, etc., the filler content should be no more than the amount which yields a total ash of approximately 50% for performance purposes.

Water content is normally in the range of from about 20% to 0% to provide for reasonable drying time.

Finally, acrylic or other latex may be used in place of styrene butadiene for special applications such as pressure-sensitive adhesives or for pure vinyl installations. Latex content will normally be in the range of about 5% to 25% of the total mixture.

With these parameters, solvent-free adhesives for virtually any floorcovering installation may be safely, effectively, and economically produced. Following are some examples of tested formulations as well as the installation to which the adhesive is directed.

EXAMPLES

1) The following formula is a high solids, maximum bond strength multi-purpose adhesive designed for difficult installations such as carpets with rough or non-porous backings (high-density urethanes, hot-melts, latex unitary). It is also suitable for double-glue installations, a system in which cushion is glued to a substrate and the carpet is subsequently glued to the cushion. This formula has a 70.4% solids content, the highest known of any multi-purpose adhesive in the industry.

| INGREDIENT | PARTS/100 |
| --- | --- |
| Severely hydrotreated petroleum hydrocarbon oil, consisting predominantly of hydrocarbons having carbon numbers in the range of C20–C50, having few enough aromatics and paraffinics to be classified as a napthenic oil | 19.1 |
| A blend of hydrocarbon resin and wood rosin, consisting of approximately 80% C9 resin and 20% wood rosin | 11.5 |
| HEAT ABOVE INGREDIENTS TO AT LEAST 240 DEGREES F. | |
| INGREDIENT | PARTS/100 |
| Potassium soap of disproportionated tall oil rosin, 80% solution in water | 6.7 |
| 45% solution of potassium hydroxide in water | .1 |
| MAKE SURE INGREDIENTS ARE WELL-MIXED AND COOL BELOW 212 DEGREES F. BEFORE CONTINUING. | |
| Water | 10.5 |
| 65% slurry of medium-grind kaolin clay in water | 36.3 |
| Cold-polymerized Styrene-Butadiene latex, 70% solids | 13.4 |
| 70.5% sorbitol solution, made from hydrogenated corn syrup | 1.5 |
| Acidic polyacrylate thickener, 30% solids | 0.6 |
| | 99.7 |

The remaining ingredients are trace amounts of the antioxidant, defoamer, and bactericide as previously described.

2) A lower solids, less expensive version of the above adhesive, suitable for all of the same applications except for hot-melts, rough unitaries, and dense urethanes. The final bond strength is lower than that of the adhesive in example number one, but this is desirable for ease of future removal in installations which do not require such high bond strengths.

| INGREDIENT | PARTS/100 |
| --- | --- |
| Severely hydrotreated petroleum hydrocarbon oil, consisting predominantly of hydrocarbons having carbon numbers in the range of C20–C50, having few enough aromatics and paraffinics to be classified as a naphthenic oil | 15.8 |
| A blend of hydrocarbon resin and wood rosin, consisting of approximately 80% C9 resin and 20% wood rosin | 9.5 |
| HEAT ABOVE INGREDIENTS TO AT LEAST 240 DEGREES F. | |
| INGREDIENT | PARTS/100 |
| Potassium soap of disproportionated tall oil rosin, 80% solution in water | 5.5 |
| 45% solution of potassium hydroxide in water | .09 |
| MAKE SURE INGREDIENTS ARE WELL-MIXED AND COOL BELOW 212 DEGREES F. BEFORE CONTINUING | |
| Water | 18.2 |
| 65% slurry of medium-grind kaolin clay in water | 41.3 |
| Cold-polymerized Styrene-Butadiene latex, 70% solids | 7.5 |
| 70.5% sorbitol solution, made from hydrogenated corn syrup | 1.5 |
| Acidic polyacrylate thickener, 30% solids | 0.5 |
| | 99.9 |

The remaining ingredients are trace amounts of the antioxidant, defoamer, and bactericide as previously described.

3) A lower solids adhesive for use in average installations involving carpets with woven synthetic, jute, or low density urethane backings. This is a high performance adhesive compared to those in its price range and is considered a "contract-grade" adhesive, suitable in price and performance for a majority of commercial applications. Again, the lower bond strengths achieved are not sufficient for difficult installations, but are desirable for ease of future removal in the average installation.

| INGREDIENT | PARTS/100 |
| --- | --- |
| Severely hydrotreated petroleum hydrocarbon oil, consisting predominantly of hydrocarbons having carbons numbers in the range of C20–C50, having few enough aromatics and paraffinics to be classified as a naphthenic oil | 11.1 |
| A blend of hydrocarbon resin and wood rosin, consisting of approximately 80% C9 resin and 20% wood rosin | 6.7 |
| HEAT ABOVE INGREDIENTS TO AT LEAST 240 DEGREES F. | |
| INGREDIENT | PARTS/100 |
| Potassium soap of disproportionated tall oil rosin, 80% solution in water | 3.9 |
| 45% solution of potassium hydroxide in water | 0.8 |
| MAKE SURE INGREDIENTS ARE WELL-MIXED AND COOL BELOW 212 DEGREES F. BEFORE CONTINUING. | |
| Water | 28.8 |
| 65% slurry of medium-grind kaolin clay in water | 38.4 |
| Cold-polymerized Styrene-Butadiene latex, 70% solids | 5.3 |
| 70.5% sorbitol solution, made from hydrogenated corn syrup | 1.5 |
| Acidic polyacrylate thickener, 30% solids | 4.1 |
| | 99.9 |

The remaining ingredients are trace amounts of the antioxidant, defoamer, and bactericide as previously described.

4) The same method as described above can also be used to produce a low-cost, plasticizer migration resistant acrylic adhesive primarily for vinyl composition tiles. Pressure-sensitive, flooring adhesives, with the proper acrylic latex selection, can be made without the use of tackifiers or solvent. However, these are designed for the installation of flexible floorcoverings and do not perform well when both substrate and floorcovering are rigid. The following formula results in a pressure-sensitive compound which has enough rigidity to prevent tile movement and is resistant to the plasticizers in pure vinyl backings.

| INGREDIENT | PARTS/100 |
| --- | --- |
| Severely hydrotreated petroleum hydrocarbon oil, consisting predominantly of hydrocarbons having carbon numbers in the range of C20–C50, having few enough aromatics and paraffinics to be classified as a naphthenic oil | 11.6 |
| A blend of hydrocarbon resin and wood rosin, consisting of approximately 80% C9 resin and 20% wood rosin | 7.0 |
| HEAT ABOVE INGREDIENTS TO AT LEAST 240 DEGREES F. | |
| INGREDIENT | PARTS/100 |
| Potassium soap of disproportionated tall oil rosin, 80% solution in water | 4.1 |
| Tall oil fatty acid (Forms potassium kaoleate, | .5 |

| -continued | |
|---|---|
| a surfactant, in situ when KOH and water are added) | |
| 45% solution of potassium hydroxide in water | 1.0 |
| MAKE SURE INGREDIENTS ARE WELL-MIXED AND COOL BELOW 212 DEGREES F. BEFORE CONTINUING | |
| Water | 21.1 |
| 65% slurry of medium-grind kaolin clay in water | 16.2 |
| Pressure-sensitive acrylic latex, 52% solids | 32.4 |
| 70.5% sorbitol solution, made from hydrogenated corn syrup | 1.5 |
| Acidic polyacrylate thickener, 30% solids | 4.6 |
| | 100.0 |

Trace amounts of antioxidant and bactericide, as previously described, are also added.

Thus, it will be appreciated by those skilled in the art, that a solvent-free adhesive can be produced which outperforms any known adhesive, particularly the class of solvent-containing adhesives which had been thought superior until now. Production of the present invention presents fewer hazards in the form of organic solvents both to the production workers and to the end-users who would normally be exposed to the evaporating solvents.

While an embodiment of a solvent-free adhesive formulation and modifications thereof have been described in detail herein, various additional changes and modifications may be made without departing from the scope of the present invention.

I claim:

1. A method for producing an adhesive containing a hydrocarbon resin, said resin having a softening point, comprising:
   a) heating petroleum oil to the softening point temperature of said resin;
   b) adding said resin to said oil to form an oil-resin mixture having an amount of oil equal to or greater than the amount of said resin, said resin being compatible with said oil;
   c) adding a surfactant to the oil-resin mixture of step (b) to form a surfactant mixture;
   d) cooling the surfactant mixture of step (c) to a temperature below the boiling point of water; and
   e) adding water to the cooled mixture of step (d) to form an emulsion for serving as said resin-containing adhesive having a high solids content.

2. The method of claim 1 and including the further step of adding a filler to said emulsion for thickening said adhesive.

3. The method of claim 1 and including the further step of adding a caustic agent to said surfactant mixture for raising the pH of said mixture and to enhance emulsion stability.

4. The method of claim 1 and including the further step of adding an antifreeze to said emulsion.

5. The method of claim 1 and including the further step o adding trace amounts of an antioxidant, a defoamer, and a bactericide to said emulsion.

6. The method of claim 1 in which said oil-resin mixture comprises approximately 10% to 40% by weight of said adhesive.

7. The method of claim 1 in which said oil is a napthenic oil present in relation to said resin in a ratio within the range of approximately 1:1 to 12:1.

8. The method of claim 7 in which said oil comprises severely hydrotreated petroleum hydrocarbon oil, having predominantly hydrocarbons with carbon numbers in the range of C20 to C50 and with few enough aromatics and paraffinics to be classified as a naphthenic oil.

9. The method of claim 1 including the additional step of adding styrene butadiene latex to said emulsion.

* * * * *